United States Patent
Kozlowski (10) Patent No.: US 7,491,021 B2
(45) Date of Patent: Feb. 17, 2009

(54) SURFACE RELIEF GRATING IMAGE MACHINING PROCESS AND PRODUCT

(75) Inventor: Andy G. Kozlowski, Elk Grove Village, IL (US)

(73) Assignee: A.M. Precision Machining, Inc., Elk Grove Village, IL (US)

( * ) Notice: Subject to any disclaimer, the term of this patent is extended or adjusted under 35 U.S.C. 154(b) by 0 days.

(21) Appl. No.: 12/113,630

(22) Filed: May 1, 2008

(65) Prior Publication Data

US 2008/0218857 A1 Sep. 11, 2008

Related U.S. Application Data

(63) Continuation of application No. 11/005,230, filed on Dec. 7, 2004, now Pat. No. 7,367,759.

(51) Int. Cl.
*B23C 3/13* (2006.01)

(52) U.S. Cl. .................. 409/132; 29/557; 359/478; 359/567; 359/572; 40/582

(58) Field of Classification Search ............... 409/131, 409/132; 29/557; 359/3, 27, 32, 33, 35, 359/558, 566, 567, 569, 572, 574, 575; 40/582; 264/138, 139

See application file for complete search history.

(56) References Cited

U.S. PATENT DOCUMENTS

| 551,769 | A |   | 12/1895 | Jacobson |  |
|---|---|---|---|---|---|
| 734,134 | A | * | 7/1903 | Porter | 396/661 |
| 1,562,835 | A | * | 11/1925 | Kuttler | 359/547 |
| 2,500,511 | A | * | 3/1950 | Bonnet | 359/463 |
| 3,463,118 | A |   | 8/1969 | Wood |  |
| 3,567,561 | A |   | 3/1971 | Wood |  |
| 3,753,713 | A | * | 8/1973 | Fraser | 355/132 |
| 4,084,339 | A | * | 4/1978 | Peltier et al. | 40/560 |
| 4,094,575 | A | * | 6/1978 | Kellie | 359/10 |
| 4,198,182 | A | * | 4/1980 | Green | 409/132 |
| 4,307,528 | A | * | 12/1981 | Dewees et al. | 40/433 |
| 4,421,380 | A |   | 12/1983 | McGrew |  |
| 4,604,329 | A | * | 8/1986 | Reber | 428/620 |
| 4,677,285 | A |   | 6/1987 | Taniguchi |  |

(Continued)

FOREIGN PATENT DOCUMENTS

EP 077405 A1 4/1983

(Continued)

*Primary Examiner*—David P Bryant
*Assistant Examiner*—Eric A Gates
(74) *Attorney, Agent, or Firm*—Dorsey & Whitney LLP (57) ABSTRACT

A product with a surface relief grating (SRG) image effect has a surface with rotational cuts effected therein to create the SRG image effect. The SRG image has an effect based on a rotational speed of a cutting tool effecting the cuts, a travel speed of a cutting tool effecting the cuts, and a depth of the cuts. A light source can be used to emit light on the surface of the product. In an SRG image machining process, a material and a cutting tool are provided. The material is contacted by the cutting tool to a predetermined depth. The cutting tool is rotated to cut the material at a predetermined rotational speed. The cutting tool is moved to cut the material at a predetermined travel speed. A SRG image effect is produced in the material through the contacting, rotating, and moving steps.

15 Claims, 6 Drawing Sheets

U.S. PATENT DOCUMENTS

| | | | |
|---|---|---|---|
| 4,773,718 A | 9/1988 | Weitzen et al. | |
| 4,921,319 A | 5/1990 | Mallik | |
| 4,986,664 A | 1/1991 | Lovoi | |
| 5,084,996 A | 2/1992 | Woodruff et al. | |
| 5,111,448 A | 5/1992 | Komma et al. | |
| 5,128,779 A | 7/1992 | Mallik | |
| 5,197,013 A | 3/1993 | Dundorf | |
| 5,211,997 A * | 5/1993 | Patel et al. | 428/29 |
| 5,314,767 A | 5/1994 | Bussard | |
| 5,335,113 A * | 8/1994 | Jackson et al. | 359/569 |
| 5,377,116 A | 12/1994 | Wayne et al. | |
| 5,378,091 A | 1/1995 | Nakamura | |
| 5,487,021 A | 1/1996 | Fujita et al. | |
| 5,521,030 A | 5/1996 | McGrew | |
| 5,543,228 A | 8/1996 | Taniguchi et al. | |
| 5,552,992 A | 9/1996 | Hunter | |
| 5,644,412 A | 7/1997 | Yamazaki et al. | |
| 5,644,413 A | 7/1997 | Komma et al. | |
| 5,680,232 A | 10/1997 | Iwamatsu et al. | |
| 5,703,782 A | 12/1997 | Dundorf | |
| 5,731,982 A | 3/1998 | Namba et al. | |
| 5,793,503 A | 8/1998 | Haines et al. | |
| 5,801,857 A | 9/1998 | Heckenkamp et al. | |
| 5,805,315 A | 9/1998 | Iwamatsu et al. | |
| 5,850,380 A | 12/1998 | Kubo | |
| 5,889,598 A | 3/1999 | Monaghan | |
| 5,909,313 A * | 6/1999 | Lee | 359/569 |
| 5,912,767 A | 6/1999 | Lee | |
| 5,969,863 A * | 10/1999 | Staub et al. | 359/567 |
| 6,017,657 A | 1/2000 | Mentz et al. | |
| 6,072,606 A | 6/2000 | Huether et al. | |
| 6,097,521 A | 8/2000 | Althaus et al. | |
| 6,099,216 A | 8/2000 | Momochi et al. | |
| 6,185,019 B1 | 2/2001 | Hobbs et al. | |
| 6,417,968 B1 * | 7/2002 | Staub et al. | 359/567 |
| 6,434,442 B1 | 8/2002 | Kawamoto | |
| 6,459,952 B1 | 10/2002 | Dundorf | |
| 6,461,544 B1 | 10/2002 | Waitts | |
| 6,470,610 B1 * | 10/2002 | Northey | 40/582 |
| 6,491,482 B1 | 12/2002 | Fenkl et al. | |
| 7,237,989 B2 | 7/2007 | Glaesser | |
| 2002/0090578 A1 | 7/2002 | Schaeffra et al. | |
| 2002/0095236 A1 | 7/2002 | Dundorf | |
| 2002/0192568 A1 | 12/2002 | Weder | |
| 2008/0198468 A1 * | 8/2008 | Kaule et al. | 359/575 |

FOREIGN PATENT DOCUMENTS

| | | |
|---|---|---|
| JP | 9-239603 A | 9/1997 |
| JP | 2004-148471 A | 5/2004 |
| SU | 763070 | 9/1980 |
| WO | 2004010167 A2 | 1/2004 |

* cited by examiner

SURFACE RELIEF GRATING IMAGE MACHINING PROCESS AND PRODUCT

CROSS REFERENCE TO RELATED APPLICATIONS

The present application is a continuation of U.S. patent application Ser. No. 11/005,230 filed 7 Dec. 2004 entitled "Surface relief grating image machining process and product," which is hereby incorporated herein by reference in its entirety.

FIELD OF TECHNOLOGY

The present invention relates generally to images formed by particular arrangements of reflective surface relief diffraction gratings and, more particularly, to a surface relief grating image effect machining process and/or product.

DESCRIPTION OF RELATED ART

Holographic images are three-dimensional images visible from an oblique angle. They appear to float in space and can change perspective. Numerous techniques for producing products with holographic images are known in the art. For example, a layer of plastic can be passed through a machine which imparts an image within the covering or upper strata of the plastic layer. A powdered metallic constituent or component is then applied thereon by a metalizing process. After metalizing, a holographic or three-dimensional image is imparted on the metalized layer of plastic. Such a holographic image is widely used within the credit card and security industries since the resulting image is difficult to duplicate and thus assists in the prevention of fraud by counterfeiting, for example.

Another example involves laminating the holographic image to a polymeric support by contacting the holographic image on the polymeric support to a substrate such as tissue paper or foil via an adhesive, and delaminating the polymeric support, thereby transferring the holographic image from the polymeric support to the tissue paper or foil substrate. The image cannot be directly applied to a substrate having a rough surface because the rough surface of the substrate will refract light and will not have a highly reflective finish, thereby disrupting the holographic image.

SUMMARY

The present invention is directed to a surface relief grating (SRG) image machining process and/or product. For the SRG image machining process a material and a cutting tool are provided. The material is contacted by the cutting tool to a predetermined depth. The cutting tool is rotated to cut the material at a predetermined rotational speed. The cutting tool is moved to cut the material at a predetermined travel speed. A SRG image is produced in the material through the above described contacting, rotating, and moving steps. A light source can be provided to emit light on the material to produce the SRG image effect.

A product with a SRG image effect has a surface with rotational cuts effected therein to create the SRG image. The SRG image has an effect based on a rotational speed of a cutting tool effecting the cuts, a travel speed of a cutting tool effecting the cuts, and a depth of the cuts. A light source can be used to emit light on the surface of the product.

BRIEF DESCRIPTION OF THE DRAWINGS

Similar reference characters denote corresponding features consistently throughout the attached drawings.

DETAILED DESCRIPTION

The present invention is a SRG image machining process and/or product. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 1:
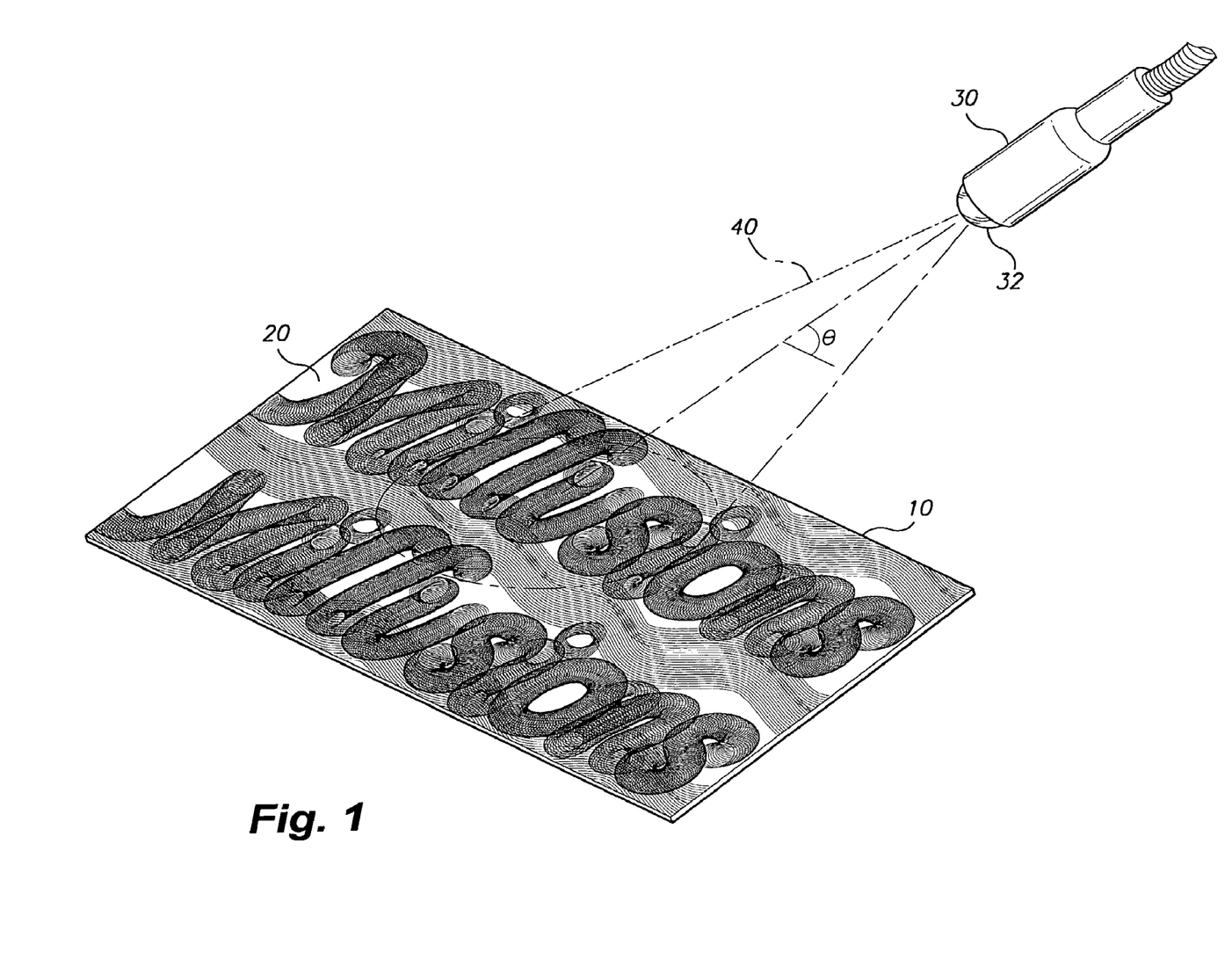
FIG. 1 is a front perspective view of a material machined with a SRG image and a light source emitting light onto the material according to the present invention.

Referring now to the drawings, FIG. 1 shows a material 10 machined with a SRG image and a light source 30 emitting light 40 onto the material 10 and illuminating the image. The SRG image is machined on the surface 20 of the material 10. The light source 30 includes a light element 32 (e.g., a light bulb or the like). To view the effects of the illumination of the SRG image on the surface 20 of the material 10, the position of the light source 30 can be adjusted to alter the angle of incidence of the emitted light 40. By altering the angle of incidence of the emitted light 40, the diffracted light waves cause the SRG image effect to appear as a three-dimensional image, having apparent depth below the surface 20, and to reflecting colors of the emitted light 40 as desired.

Figure 2:
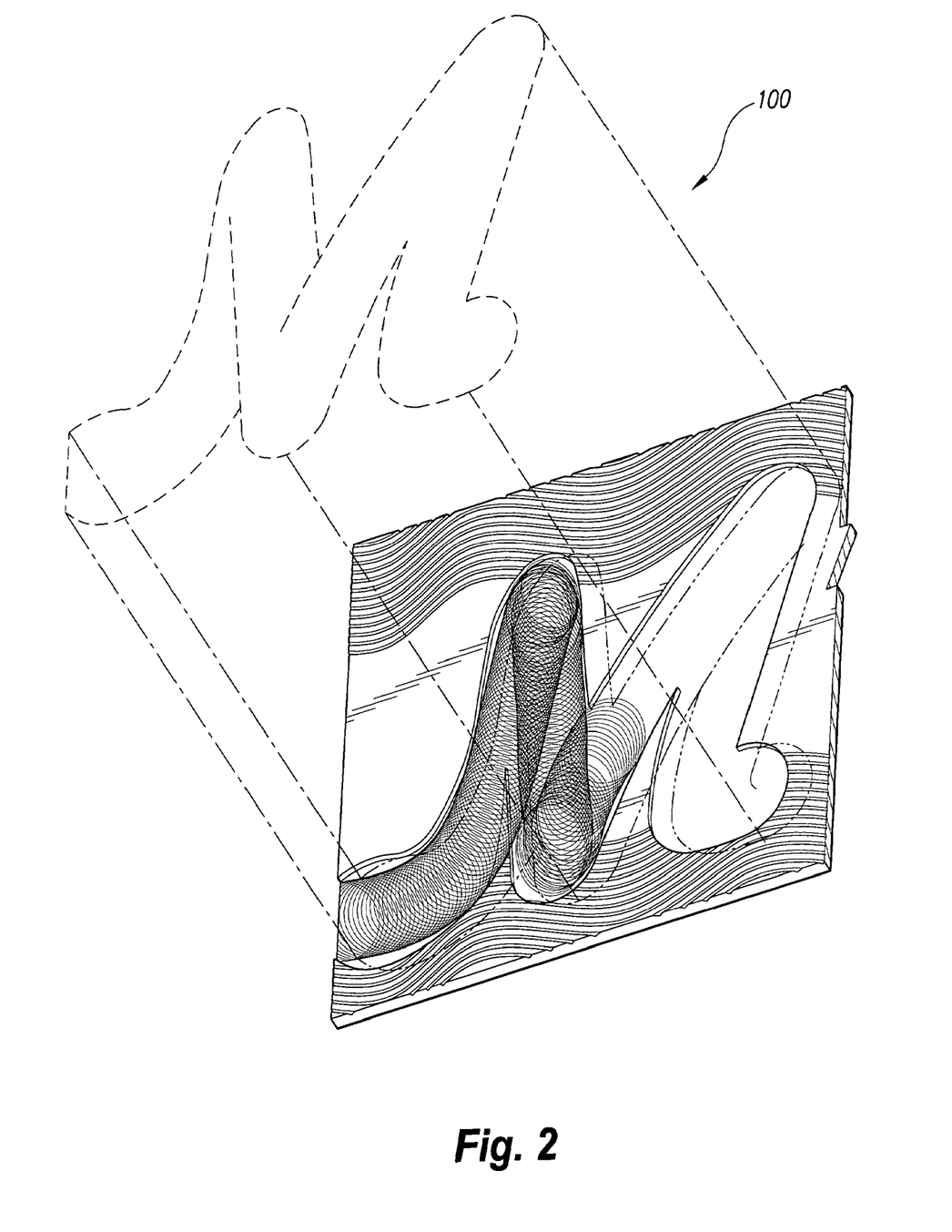
FIG. 2 is an enlarged portion of a material partially machined with a SRG image according to the present invention.
Figure 6:
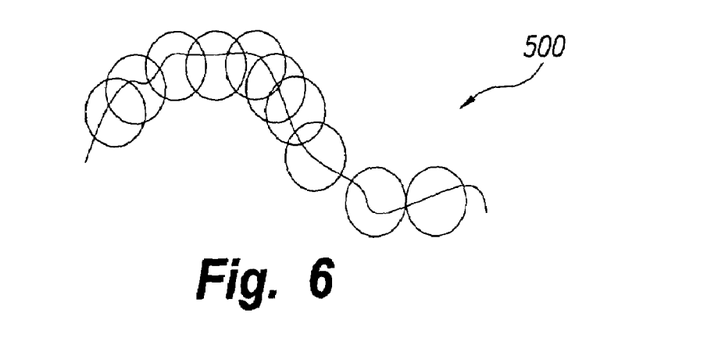
FIG. 6 is a top view of a tool path of a machining process according to the present invention.

FIG. 2 illustrates a partially machined material surface 100. As shown in FIG. 2, the material surface is machined by a rotational cutting tool, for example, an end mill as further described with respect to FIG. 6. The cutting tool may have one or more blades. The blades of the cutting tool cut into the surface of the material to scribe or score an array of generally circular grooves in relief. The grooves may be spaced closely together as shown in FIG. 2. The grooves forming adjacent circular lines are predominantly parallel curves, thus forming a surface relief grating that creates a corresponding interference pattern and thus the three-dimensional image corresponding to the primary milled image as shown in FIG. 2 at an apparent subsurface depth as described above.

The spacing of the grooves is a function of the number of blades on the cutting tool, the rotational speed of the cutting tool, and the travel speed of the cutting blade across the material. It should be apparent that as the cutting tool rotates, the cutting blades will carve grooves in the surface of the material. Because the cutting tool rotates, the grooves carved would be circular if the cutting tool were to remain stationary. However, as shown in FIGS. 1, 2, and 4-6 and further described herein, the cutting tool travels across the material. Thus, each blade of the cutting tool will actually form a planar coil-shape with generally circular, but slightly oblique, continuous loops across the surface of the material.

It should be apparent that a cutting tool operated at a slower rotation and a higher travel speed will cut grooves at a greater separation distance than a cutting tool with a relatively higher rotation speed and a relatively slower travel speed. It should also be apparent that a cutting tool with four blades positioned equiangularly on the tool will carve the same groove pattern with the same separation distance between grooves as a cutting tool with two opposing blades moving across the material at half the travel speed of the four blade tool.

As shown in FIGS. 1 and 2, the grooves formed by each blade are separated by a small gap for an arc length that is slightly shorter than half the "circumference" of a complete rotation of the cutting tool along both the leading edge and the trailing edge of the path of the cutting tool. Further note in FIGS. 1 and 2 that as the cutting tool travels across the material, the grooves formed along the trailing edge of the movement of the cutting tool are carved across the grooves previously carved along the leading edge of travel, thus creating a pattern of intersecting arcs of opposite directions of curvature. Also, the grooves formed along the edges of the "circles" parallel to the direction of travel of the cutting tool may almost entirely overlap depending upon the separation distance between successive arcs. This pattern is further indicated in FIGS. 5 and 6, although these figures are meant to indicate various tool paths generally and do not depict the actual oblique, planar coil-shape nature of the grooves.

As used herein, "SRG image" means a three-dimensional image effect seen in the material visible from an oblique angle. Such SRG image effects appear to float in space and can change perspective. As with any interference pattern formed by a diffraction grating, the position, depth, and resolution of the image resulting from the pattern is primarily dependent upon the spacing between the grooves and to a lesser extent on the depth and angle or bevel of the grooves. An exemplary SRG image effect is indicated in FIG. 2 by the dashed and dotted line showing the stylized letter "M" offset in three dimensions from the machined "M" form in the material surface 100. The dashed projection of the letter "M" shown above the material surface 100 is meant as a visual aid to the viewer to indicate the position of the SRG image as viewed in the material. The SRG image can be in any geometric form, any non-geometric form, or any combination of geometric or non-geometric forms, such as alphanumeric characters, shapes, patterns, images, circles, ovals, triangles, squares, rectangles, octagons, etc. Additional forms can be icons, pictures, slogans, logos, signs, cartoon characters, flowers, etc.

The light element 32 is preferably one or more light emitting diodes (LEDs) or halogen lights, but can be any type of incandescent source with varying effects on the visual effects of the SRG image. Such incandescent sources can be candle-luminescent sources (e.g., gas mantles, carbon arch radiation sources, etc.), cathode luminescent sources using electronic satiation, electro-luminescent sources (e.g., electro-luminescent lamps, filament lamps, etc.), fluorescent sources, lasers, phosphorescence sources, photo-luminescent sources (e.g., gaseous discharges, etc.), and/or pyro-luminescent sources (e.g. flames, etc.). Additional miscellaneous luminescent sources include crystallo-luminescent sources, galvano-luminescent sources, kine-luminescent sources, radioluminescent sources, sonoluminescent sources, thermo-luminescent sources, and/or triboluminescent sources. The light element 32 can also include luminescent polymers capable of producing primary colors.

The light element 32 emits light 40 to illuminate the SRG image with a color on the surface 20 of the material 10. As used herein, "illuminate" means the production of a frequency of radiation by the light element 32, and "color" means any frequency of radiation within a spectrum. More particularly, "color" encompasses frequencies not only of the visible spectrum, but also frequencies in the infrared and ultraviolet areas of the spectrum, and in other areas of the electromagnetic spectrum.

The material 10 can be any of a variety of materials, such as wood, plastic, acrylic, etc., and can be any metal, such as aluminum, copper, brass, titanium, magnesium, stainless steel, and any other ferrous and/or non-ferrous metal, or combinations thereof. The material can also be configured to be placed on or integrated with other structures, such as tables, walls, furniture, musical instruments, bicycles, cars, boats, airplanes, etc. (See FIGS. 8A-8F.) The material 10 can have any desired thickness.

The material 10 is processed according to the invention to produce the SRG image effect. The process may be carried out on any type of machine that can use a rotating cutting tool. For example, a multi-axis computer numerically controlled (CNC) machine having a cutting tool that is configured to operate upon a workpiece can be used. Alternatively, a manually operated machine may be used to perform the process. The cutting tool is preferably a type of end mill with a number of flutes, such as two to eight, etc. (See FIG. 7.) Various types of end mills may be used, such as finishing, tapered, corner rounds, ball nose, roughing, shell, etc. Alternatively, the cutting tool may be configured as an engraving tool or the like. Such cutting tools cut the material by creating a series of circular scratches, tool marks, etc. The depth of cut, or the amount of material removed, does not necessarily determine the effect of the SRG image. Rather, the rotating speed of the tool and the travel speed of the tool across the surface 20 of the material 10 determine the separation distance between parallel arcs which, together with the depth of the cut of the circular scratches or tool marks created by the tool, determine the outcome of the effect of the SRG image.

Figure 3:
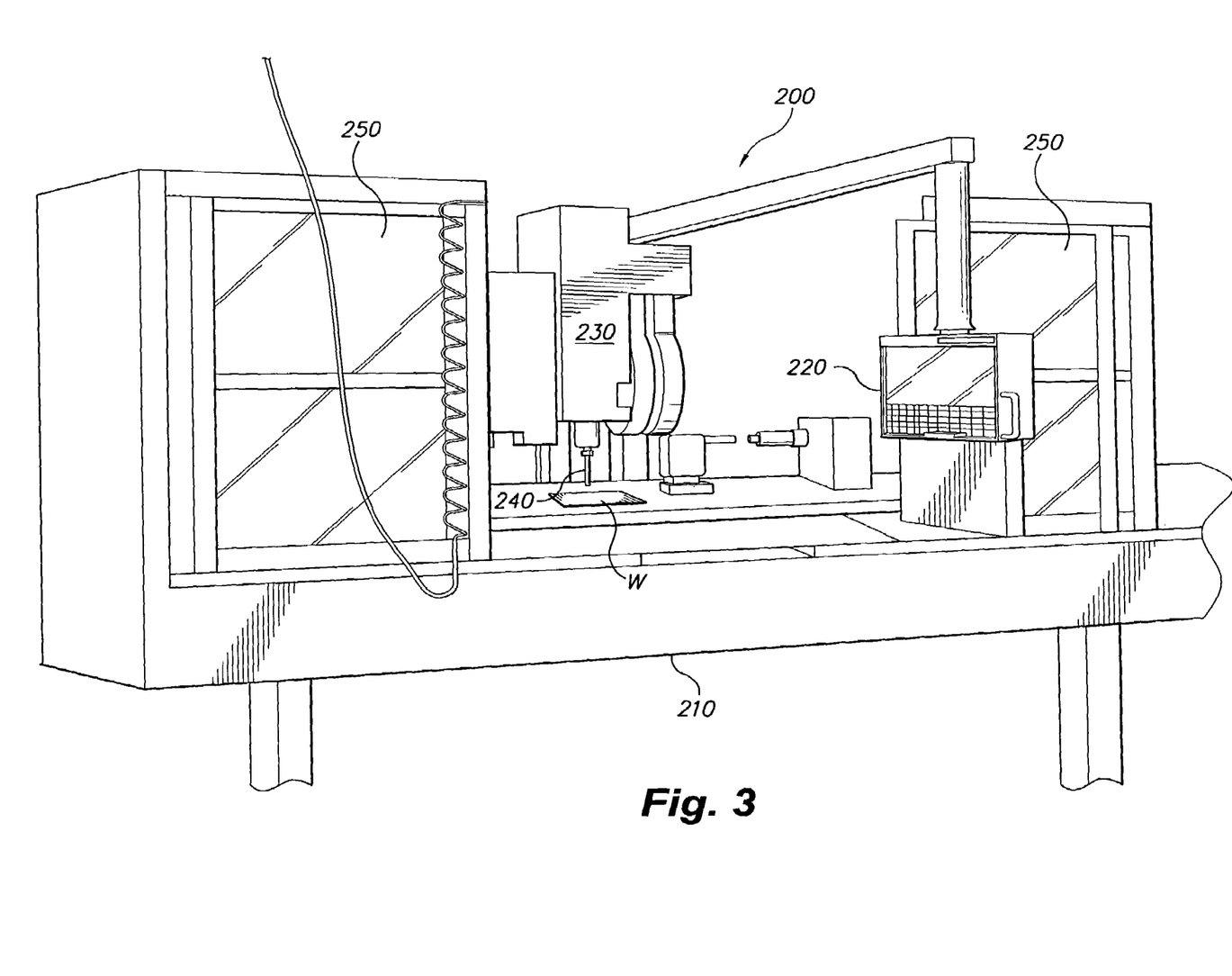
FIG. 3 is a front view of a vertical machining tool configured to carry out a machining process according the present invention.

FIG. 3 shows an example of a CNC vertical machining tool 200 that can be used to carry out the process according to the invention. The machining tool 200 includes a frame or base 210 and is configured to utilize a cutting tool 240. The machining tool 200 holds a workpiece W in a controlled position and the cutting tool 240 travels along a predetermined tool path by movable servo motors 230 that are interconnected to a controller 220. The controller 220 includes a user interface with input/output elements such as keys, buttons, etc., as well as a display (e.g., a liquid crystal display (LCD), an LED display, a cathode ray tube, etc.) to show the cut material in real time or other displays, such as the desired tool path, etc. Protective shielding 250 formed of protective material such as LEXAN or the like is provided for enhancing the safety of tool operators.

The machining tool 200 is controlled by a computer program, called a part program, which serially instructs the machining tool 200 to perform a sequential series of discrete operations in a predetermined sequence so that the cutting tool 240 moves along the programmed tool path determined by the part program. Part programs can be written using G&M code programming which is well known in the art ('G' refers to preparatory code and 'M' refers to miscellaneous machine functions). Other appropriate programming code can also be used. Each individual instruction is termed a "block" and standard programming blocks include start-up commands for setting particular machine parameters, cutting tool parameters, etc.

Additional blocks set forth the travel speed of the cutting tool 240 across the workpiece W, the rotational speed of the cutting tool 240, and the depth of cut in the workpiece by the cutting tool 240. The blocks effect commands for each or a combination of controllable axes of the machining tool 200. The blocks, once programmed into the controller 220, either directly or remotely through a wireless and/or wired communicatively interconnected computer, are then fixed in a set sequential order. The whole set of sequential blocks can then be automatically operated by the machining tool 200 which then operates from start to finish of the part program.

Once the machining tool 200 is programmed for a particular workpiece W, the workpiece W is mounted on the machining tool 200 via clamps or the like, and the cutting tool 240 is rotated to cut the workpiece W at a predetermined rotational speed and depth. The cutting tool 240 is also moved to cut the workpiece W at a predetermined travel speed and depth. The rotational speed, travel speed, and depth of cut can be varied during the course of movement of the cutting tool 240 to produce desired SRG image effects on the surface of the workpiece W. The rotational speed of the cutting tool 240 can vary as desired, such as between zero and about 100,000 rpm, and the travel speed can vary as desired, such as between zero and about 100,000 inches per minute (for example, 4,000 rpm and 100 inches per minute).

Figure 4:
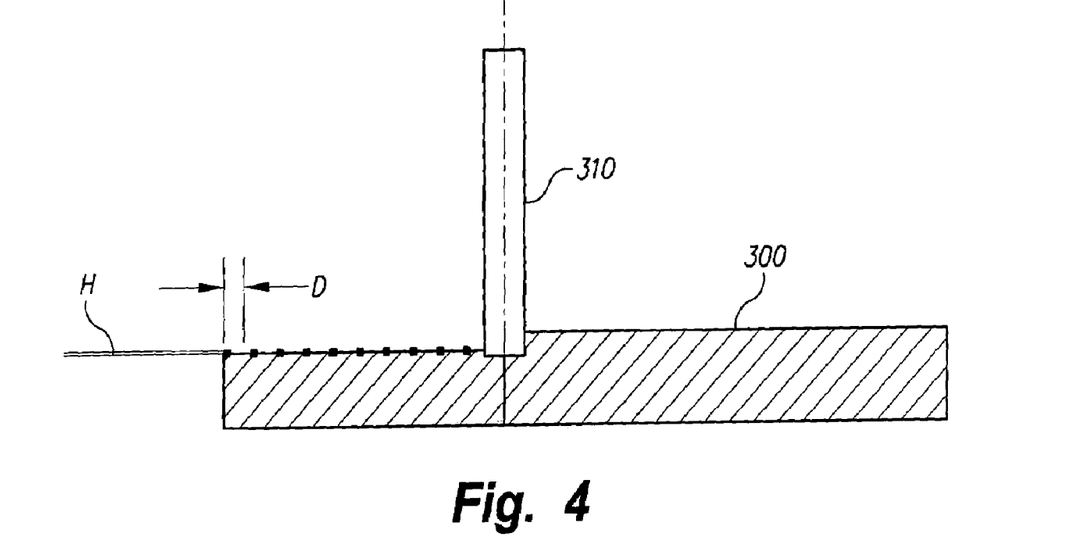
FIG. 4 is a cross sectional side view of a material being machined according to the present invention.
Figure 5:
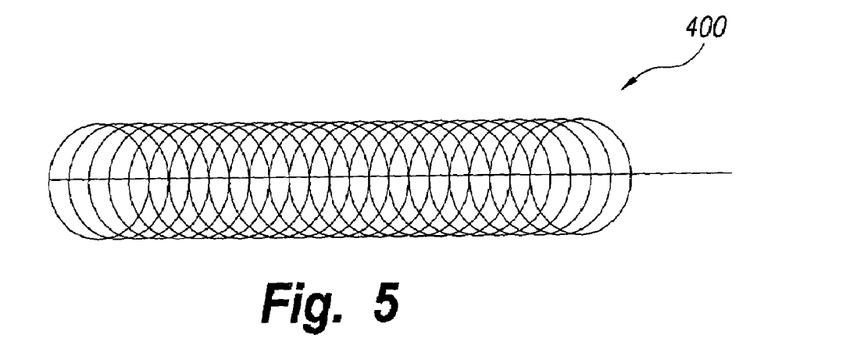
FIG. 5 is a top view of a tool path of a machining process according to the present invention.
Figure 7:
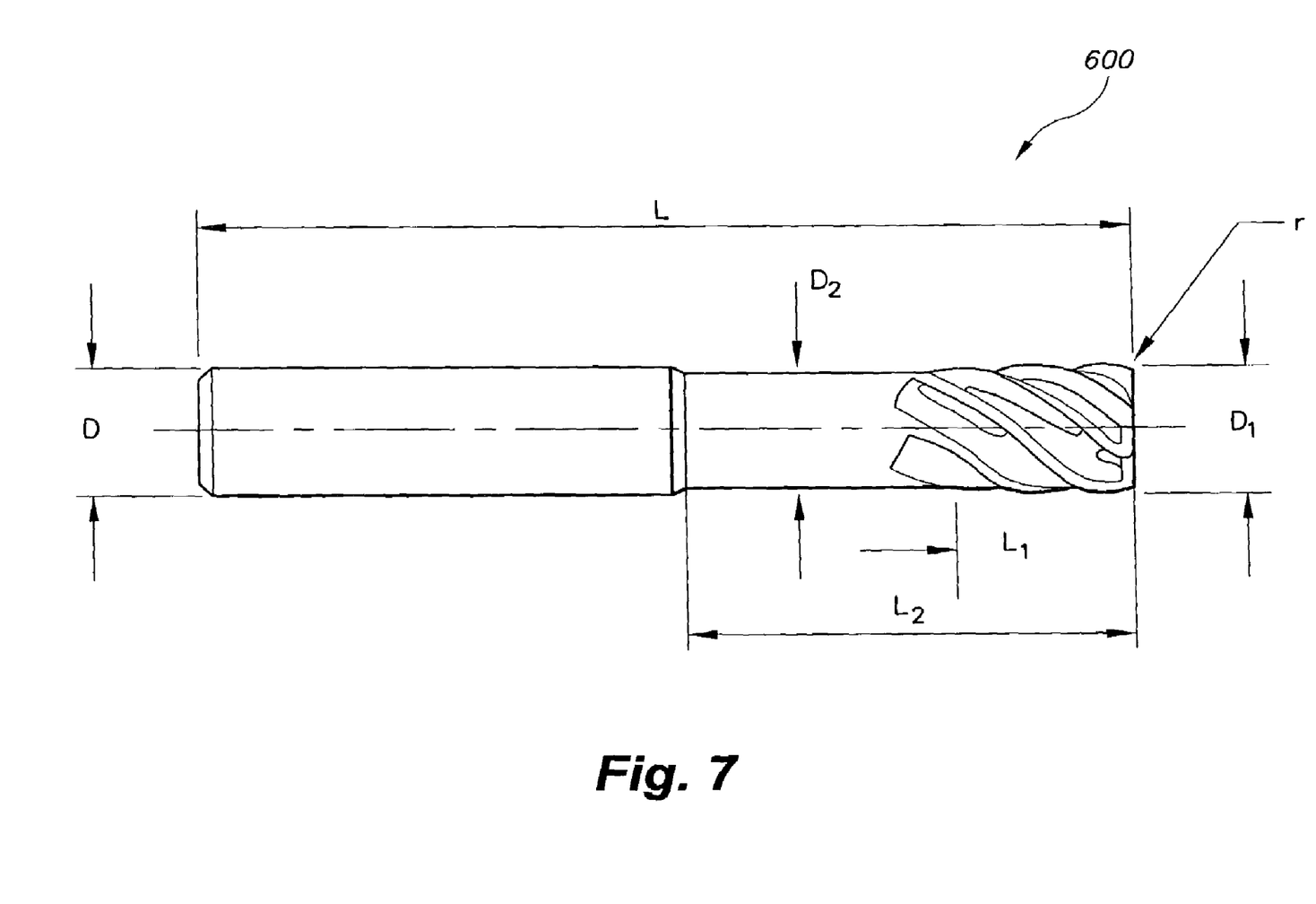
FIG. 7 is a side view of an end mill for use in a machining process according to the present invention.

FIG. 4 shows a material 300 being machined with a cutting tool 310. The cutting tool 310 follows along a tool path, such as tool path 400 shown in FIG. 5, tool path 500 shown in FIG. 6, or the like. An end mill 600 for use with the process is shown in FIG. 7. The end mill 600 has an overall length L with an outer diameter D, a cutting portion having an outer diameter D2 with a length L2 including a length L1 with cutting flutes ending with a cutting diameter D1, and a cutting radius r.

Figure 8A:
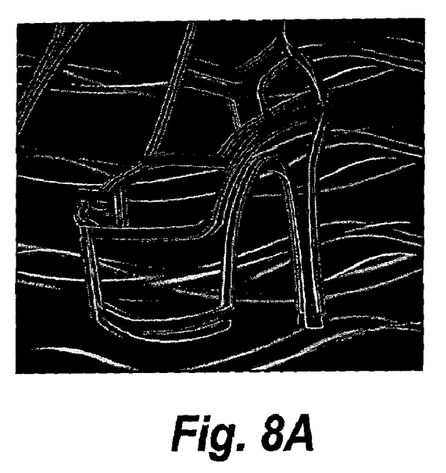
FIGS. 8A, 8B, 8C, 8D, 8E, and 8F are examples of products machined with SRG images according to the present invention.
Figure 8B:
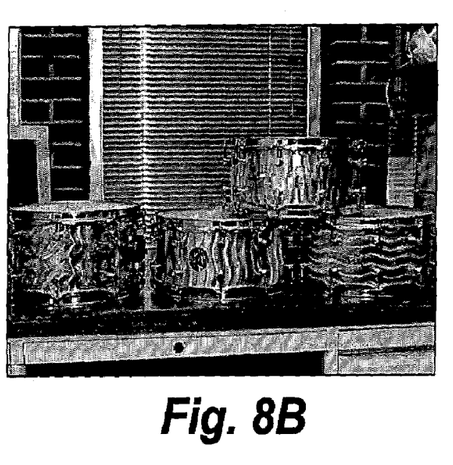
Figure 8C:
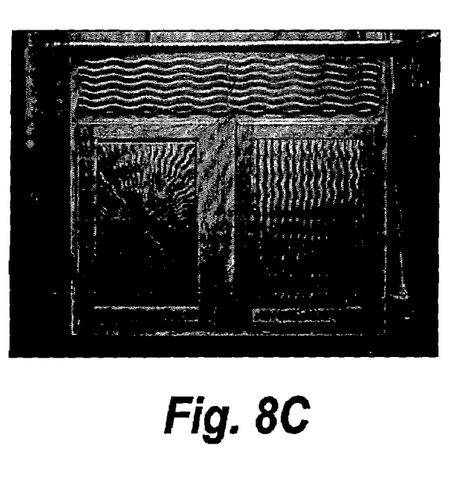
Figure 8D:
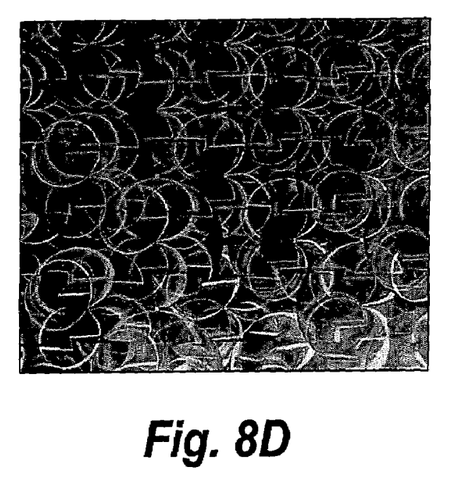
Figure 8E:
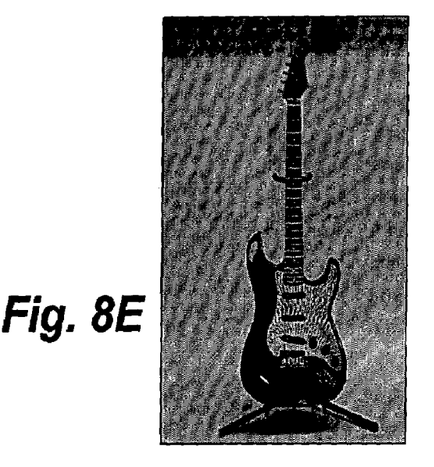
Figure 8F:
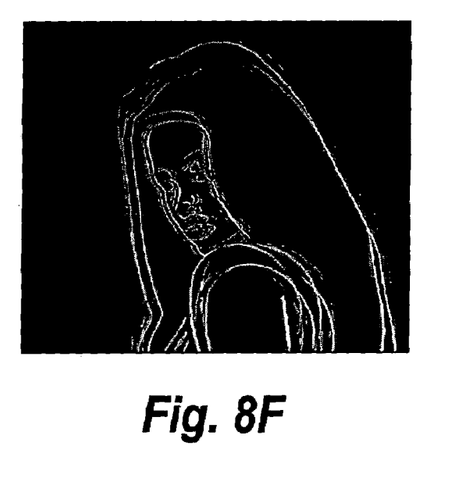

Examples of products machined according to the process are shown in FIGS. 8A through 8F. FIG. 8A shows a shoe, FIG. 8B shows drum surfaces, FIG. 8C shows a furniture surface, FIG. 8D shows a material with a pattern, FIG. 8E shows a guitar with a metal surface, and FIG. 8F shows a picture of a lady. The products may be configured in any desired configuration.

In summary, to carry out the SRG image machining process according to the invention, a material and a cutting tool are provided. The material is contacted by the cutting tool at a predetermined depth. The cutting tool is rotated to cut the material at a predetermined rotational speed. The cutting tool is moved to cut the material at a predetermined travel speed. A SRG image effect is produced in the material through the above described contacting, rotating, and moving steps. A light source can be provided to emit light on the material to produce the SRG image effect.

A product with a SRG image has a surface with rotational cuts effected therein to create the SRG image effect. The SRG image has an effect based on a rotational speed of a cutting tool effecting the cuts, a travel speed of a cutting tool effecting the cuts, and a depth of the cuts. A light source can be used to emit light on the surface of the product to produce the image effect.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A manufacture comprising a material with a reflective machineable surface defining an array of substantially circular, intersecting grooves, arranged serially and extending centered along a line, and wherein arc lengths of adjacent grooves are parallel and are separated by substantially the same distance to form a surface relief grating that causes the three-dimensional image effect to appear within the material when exposed to a light source.

2. The manufacture of claim 1, wherein the array of grooves is arranged in one or more of an alphanumeric pattern, a geometric pattern, or an illustration.

3. The manufacture of claim 1, wherein the array of substantially circular, intersecting grooves further comprises a planar coil-shape of slightly oblique, continuous loops across the surface of the material.

4. The manufacture of claim 1, wherein the three-dimensional image effect has an apparent depth below the surface of the material.

5. The manufacture of claim 1, wherein the surface relief grating is made by a milling process.

6. The manufacture of claim 5, wherein the milling process further comprises the use of a rotary cutting tool.

7. The manufacture of claim 1, wherein the surface relief grating is made by an engraving process.

8. A sign configuration comprising a material with a reflective machineable surface defining an array of substantially circular, intersecting grooves, arranged serially and extending centered along a line, wherein arc lengths of adjacent grooves are parallel and are separated by substantially a same distance to form a surface relief grating; and a light source that emits light onto the surface of the material to cause a three-dimensional image effect to appear within the material.

9. The sign configuration of claim 8, wherein the array of grooves is arranged in one or more of an alphanumeric pattern, or a geometric pattern, or an illustration.

10. The sign configuration of claim 8, wherein the array of substantially circular, intersecting grooves further comprises a planar coil-shape of slightly oblique, continuous loops across the surface of the material.

11. The sign configuration of claim 8, wherein the light source is one or more of a light emitting diode, a halogen light, or a laser.

12. The sign configuration of claim 8, wherein the three-dimensional image effect has an apparent depth below the surface of the material.

13. The sign configuration of claim 8, wherein the surface relief grating is made by a milling process.

14. The sign configuration of claim 13, wherein the milling process further comprises the use of a rotary cutting tool.

15. The sign configuration of claim 8, wherein the surface relief grating is made by an engraving process.

* * * * *